Dec. 15, 1970    R. W. SEABURY, JR    3,548,308
INDICATING INSTRUMENT HAVING A HEATER COIL IMMERSED IN A FLUID
Filed Jan. 15, 1968
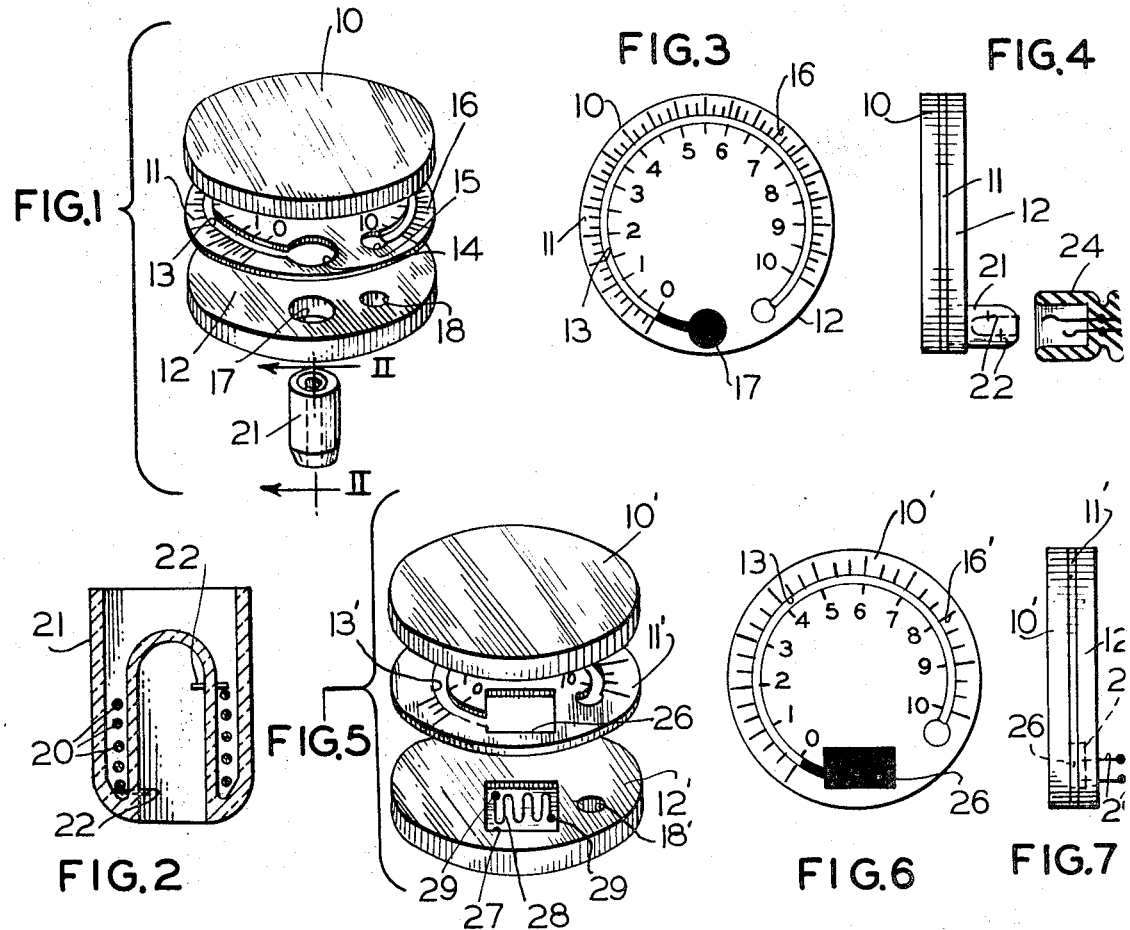
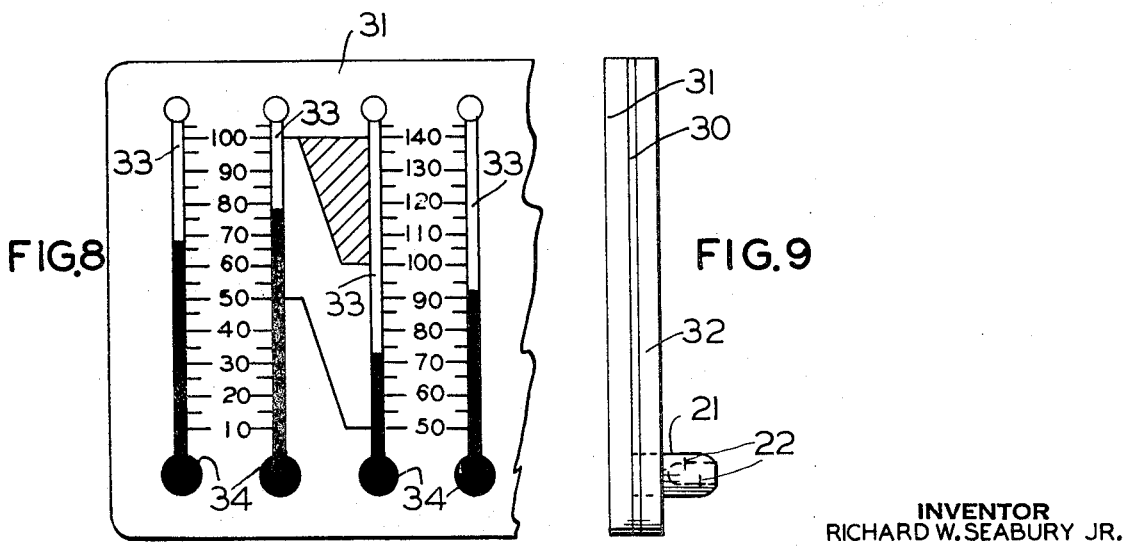
INVENTOR
RICHARD W. SEABURY JR.
BY
*Rudolph J. Lurich*
ATTORNEY United States Patent Office 3,548,308
Patented Dec. 15, 1970

3,548,308
INDICATING INSTRUMENT HAVING A HEATER COIL IMMERSED IN A FLUID
Richard W. Seabury, Jr., Towaco, N.J., assignor to RFL Industries, Inc., Boonton, N.J., a corporation of New Jersey
Filed Jan. 15, 1968, Ser. No. 697,951
Int. Cl. G01r 5/26
U.S. Cl. 324—106               2 Claims

ABSTRACT OF THE DISCLOSURE

An indicating instrument having a heater coil immersed in a fluid contained within a sealed housing formed of a plurality of flat plates. The flow of current through the heater coil results in an expansion of the fluid as a visible column having a calibrated scale associated therewith.

BACKGROUND OF THE INVENTION

The invention relates to meters for indicating the value of a remote, variable condition such as pressure, temperature, etc., such meter being of the class comprising a heater coil connectable to an electric circuit and heat-coupled to a fluid contained within a sealed housing. The fluid expands as a visible column in correspondence with the current flowing through the heater coil, said column having associated therewith a suitable scale.

Prior art meters of this class are of expensive construction, easily damaged and the heater coil is external of the fluid, thereby resulting in variable heat loss which effects the accuracy of the meter indication.

A meter made in accordance with this invention is of economical construction, withstands physical shock and vibration, has a high sensitivity coupled with improved readability, and affords a wide design latitude in physical dimensions.

SUMMARY OF THE INVENTION

The housing of the meter comprises a laminate formed of three flat plates constructed and arranged to provide a fluid reservoir open to a columnar passageway. The passageway comprises a slot formed in the center plate, whereby the cross-sectional area of the passageway is determined by the width of the slot and the thickness of the center plate. Also, the reservoir can be of a desired capacity and made to close dimensions. These features make it possible to provide a meter having a desired sensitivity and accuracy of indication, thereby eliminating the need for hand calibration of the scale. Further, the heater coil is immersed in the fluid, thereby providing a maximum heat transfer from the coil to the fluid and minimizing the effect of external, varying heat gradients upon the meter indications.

An object of this invention is the provision of an electro-fluidic meter of improved design and low manufacturing cost.

An object of this invention is the provision of an electro-fluidic meter wherein the heater coil is immersed in the fluid, thereby to maximize the response characteristic of the meter and minimize the effect of ambient temperature changes.

An object of this invention is the provision of a meter comprising a sealed housing formed of a plurality of flat plates constructed and arranged to form a fluid reservoir open to a columnar passageway, a heater coil immersed in fluid contained in the reservoir and a calibrated scale associated with the passageway.

The above-stated and other objects and advantages of the invention will become apparent from the following description when taken with the accompanying drawings showing several embodiments of the invention. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views;

FIG. 1 is an exploded, isometric view showing the component parts of an electro-fluidic meter made in accordance with one embodiment of this invention;

FIG. 2 is a cross-sectional view taken along the line II—II of FIG. 1 and drawn to an enlarged scale;

FIG. 3 is a front elevational view of a meter made up of the parts shown in FIG. 1;

FIG. 4 is a side elevational view thereof;

FIG. 5 is an exploded view showing the component parts of a meter made in accordance with another embodiment of the invention;

FIG. 6 is a front elevational view of a meter made up of the parts shown in FIG. 5;

FIG. 7 is a side elevational view thereof;

FIG. 8 is a fragmentary, front elevational view of a meter made in accordance with another embodiment of the invention; and FIG. 9 is a side elevational view thereof.

DESCRIPTION OF THE PREFERRED EMBODIMENTS

Referring now to FIGS. 1–4, the meter comprises a laminate formed of three borosilicate glass discs, namely, a front disc 10, a center disc 11, and a back disc 12. The center disc is relatively thin, and has formed therein a circular slot 13 terminating in two circular holes 14 and 15. A scale 16 is carried by the center disc, such scale preferably being etched on the surface proximate to the front disc. The back disc 12 has formed therein a hole 17, corresponding to the hole 14 in the center disc, and a fill hole 18. A coating of frit, or a suitable material which wets the glass, is applied to the proximate surfaces of the discs, after which the three discs are heat-sealed together to form a laminate.

A heater coil 20 (see FIG. 2) is disposed within a tubular member 21 made of precision borosilicate glass tubing having a reentrant end forming an axial opening which is closed at the inner end thereof. The ends of the heater coil are welded to two terminals 22 which extend into said axial opening. The open end of the tubular member is inserted into the hole 17 and heat-sealed to the back disc 12, whereby the interior of this member communicates with the hole 17 and the slot 13. It may here be pointed out that the interior of the tubular member 21 and the circular hole 14 constitute a fluid reservoir open to a circular passageway of rectangular cross-section as defined by the walls of the slot 13 and the overlying discs 10 and 12. The described assembly is placed into a vacuum chamber, which chamber then is evacuated to remove air from the reservoir and the column, after which a suitable fluid such as, for example, dimethyl silicone tinted by Oil Blue N, is injected through the fill hole 18. The fluid fills the reservoir and the injection of the fluid is continued until the fluid column is aligned with the zero mark on the scale 16. The unfilled space in the circular passageway may then be filled with an inert gas at a pressure of one or more atmospheres, after which the fill hole is sealed.

The heater coil, which is immersed in the fluid, is connectable to an electrical circuit by means of a suitable socket such as, for example, the socket 24 shown in cross-section in FIG. 4. Such socket made, of rubber or a pliable plastic, carries two spring contacts which individually engage the pin terminals 22 when the socket is pressed over the tubular member 21. Additionally, the socket serves as a thermal barrier to minimize heat loss from the heater coil to the atmosphere. Flow of current through the heater coil results in an expansion of the fluid into the columnar passageway 13 in correspondence with the magnitude of the current flowing through the coil. Thus, with the heater coil connected into an electrical circuit energized by a voltage of fixed magnitude, the device serves as a remote indicator of a variable condition sensed by a transducer which changes the circuit resistance in correspondence with changes in the condition. When the meter is used in conjunction with a pressure sensor, the scale 16 is marked in pressure values, whereas the scale is marked in temperature values when the patricular meter is used in conjunction with a temperature sensor.

A modification of the meter construction is shown in FIGS. 5-7 to which reference now is made. In this case, one end of the circular slot 13', formed in the center disc 11', terminates in a generally rectangular opening 26. The back disc 12' has formed therein a cavity 27, corresponding in size and shape to the opening 26, and a fill hole 18. A heater coil 28 is disposed within such cavity and has ends welded to the two pin terminals 29. The three discs are heat-sealed together and the fluid is injected through the fill hole, in the same manner as has been described with reference to FIGS. 1-4.

The described, three disc construction of a remote indicator lends itself to the production of a multi-meter having a versatility of simultaneous intelligence presentation. As shown in FIGS. 8 and 9, such meter comprises a center plate 30 heat-sealed to a front plate 31 and a back plate 32. The center plate has a plurality of parallel slots 33 formed therein, each slot terminating in a circular hole 34. The back plate 32 is provided with corresponding circular holes communicating with the holes of center plate, and a plurality of fill holes, each fill hole communicating with one of the said slots. A corresponding member of tubular members 21, carrying heater coils, are heat-sealed to the back plate, each tubular member having an end disposed within a circular hole of the back plate. Suitable scales are associated with the liquid columns to provide simultaneous indications of the values of variable conditions under measurement. As shown in the drawing, multi-pairs of instruments are arranged so that the relationship of the scales is graphically illustrated.

In each of the described embodiments of the invention, the three discs, or plates, may be transparent with the scale etched on the surface of the center disc. In such arrangement the alignment of the top of the fluid column with a scale graduation can be read from either the front or the back of the meter. Alternatively, the back disc may be opaque and of a color which contrasts with that of the particular fluid. Further, the scale can be formed on the outer surface of the front disc and glazed over.

The sensitivity of a particular meter, that is, the expansion of the fluid within the columnar passageway per unit current flowing through the heater coil, is determined by volume of the fluid, the coefficient of expansion of the fluid and the cross-sectional area of the passageway. By etching techniques, the thickness of the center disc and the width of the slot formed therein can be controlled within close limits, as can also the internal volume of the tubular member or cavity containing the heater coil. These factors, together with the selection of the partic- ular fluid and heater coil, make it possible to provide a meter having a desired sensitivity and accuracy, and eliminates the necessity for hand calibrating of the scale. Also, the rectangular, cross-sectional configuration of the columnar passageway results in the presentation of a wide fluid column to the front of the meter, thereby facilitating the reading of the meter irrespective of whether the scale is formed on the center or the front discs. The immersion of the heater coil in the fluid provides a maximum heat coupling to the fluid, thereby resulting in a rapid expansion of the fluid in correspondence with increased current flow through the coil. Furthermore, with the fluid and the heater coil disposed within a sealed housing having relatively thick walls, the effect of ambient temperature changes on the meter indication is minimized.

Having now described the invention, those skilled in this art will be able to make various changes and modifications without thereby departing from the scope and spirit of the invention as recited in the following claims.

I claim:
1. An indicating instrument comprising,
   (a) a sealed laminar housing formed of three flat plates, one of the outer plates being transparent,
   (b) means forming an elongated slot and an enlarged opening extending through the center plate, said opening communicating with the slot and constituting a reservoir,
   (c) a calibrated scale formed on a surface of the center plate and extending along the said slot,
   (d) an opening formed in an outer plate and communicating with the said reservoir,
   (e) a tube having a reentrant end forming an axial opening which is closed at the inner end thereof,
   (f) means securing said tube to that outer plate which has the opening communicating with the reservoir, the interior of the tube being open to the said re-reservoir,
   (g) a fluid filling the reservoir and tube and extending into said elongated slot,
   (h) a heater element immersed in the fluid and encircling the axial opening formed in the said tube, and
   (i) connection terminals connected to the heater element and having ends extending into the axial opening formed in the tube.

2. The invention as recited in claim 1, wherein the said plates are circular discs made of borosilicate glass, and wherein the said elongated slot is concentric with the axis of the discs.

References Cited

UNITED STATES PATENTS

| 456,172 | 7/1891 | Thomson | 324—106X |
| 3,316,376 | 4/1967 | Corrsin | 324—94X |
| 1,128,516 | 2/1915 | Riley | 73—330 |
| 3,464,009 | 8/1969 | Corrsin | 324—93 |

FOREIGN PATENTS

| 13,901 | 8/1900 | Great Britain | 324—106 |

RUDOLPH V. ROLINEC, Primary Examiner

E. F. KARLSEN, Assistant Examiner

U.S. Cl. X.R.

73—371